Sept. 13, 1949.  F. O. GODLEY  2,481,995
CENTER DELIVERY RAKE
Filed Oct. 24, 1947  3 Sheets-Sheet 3
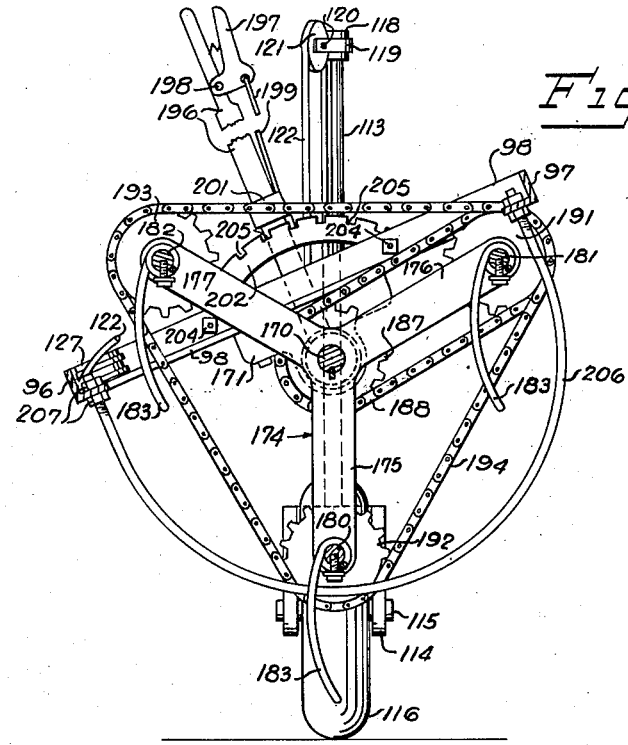
Fig-3
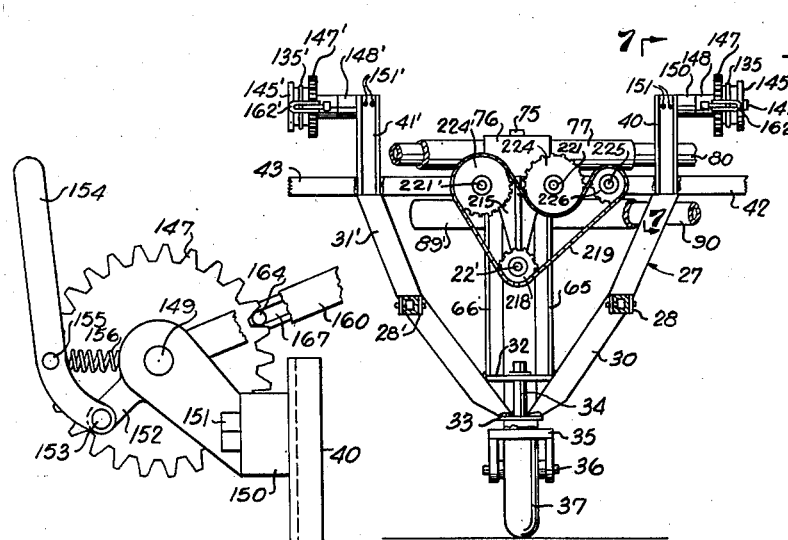
Fig-4
Fig-7
FRED O. GODLEY,
Inventor.
By
Attorney Patented Sept. 13, 1949

2,481,995

UNITED STATES PATENT OFFICE 2,481,995

CENTER DELIVERY RAKE

Fred O. Godley, Charlotte, N. C., assignor, by mesne assignments, to Sperry Corporation, New York, N. Y., a corporation of Delaware Application October 24, 1947, Serial No. 781,947

6 Claims. (Cl. 56—27)

1

This invention relates to improvements in agricultural machines and is more especially concerned with a side-delivery rake of a type to be supported on wheels and drawn back of a tractor and having a pair of rotary rake reels driven from the tractor power takeoff shaft.

It is an object of this invention to provide a rake which will direct the raked material centrally of the machine from either one or both sides as desired and deposit said material in windrows.

It is another object of this invention to provide novel means for manually adjusting the angle at which the tines of the rake reel will contact the material being raked.

It is another object of this invention to provide two rake reels which will be suspended, said suspension providing a means for raising and lowering the rake reels independently of each other.

It is another object of this invention to provide two rake reels whose front ends may be manually adjusted inwardly or outwardly with respect to each other in order to cover a larger or smaller area, depending upon the consistency or density of the vegetation disposed on the ground.

It is another object of this invention to provide means driven by the power takeoff of the tractor pulling the rake for imparting rotation to the rakes.

This application is a continuation in part of the subject matter disclosed in my co-pending application Serial Number 735,581, filed March 19, 1947.

Some of the objects of the invention having been stated, other objects will appear as the description proceeds when taken in connection with the accompanying drawings, in which Figure 1 is a top plan view of the apparatus;

Figure 3 is a vertical sectional view taken along the line 3—3 in Figure 1;

Figure 4 is a vertical sectional view, mostly in elevation, and taken along the line 4—4 in Figure 1;

Figure 5 is a longitudinal sectional view taken along the line 5—5 in Figure 1;

Figure 6 is a vertical sectional view taken along the line 6—6 in Figure 1;

Figure 7 is a vertical sectional view, mostly in elevation and taken along the line 7—7 in Figure 4.

2

Figure 1:
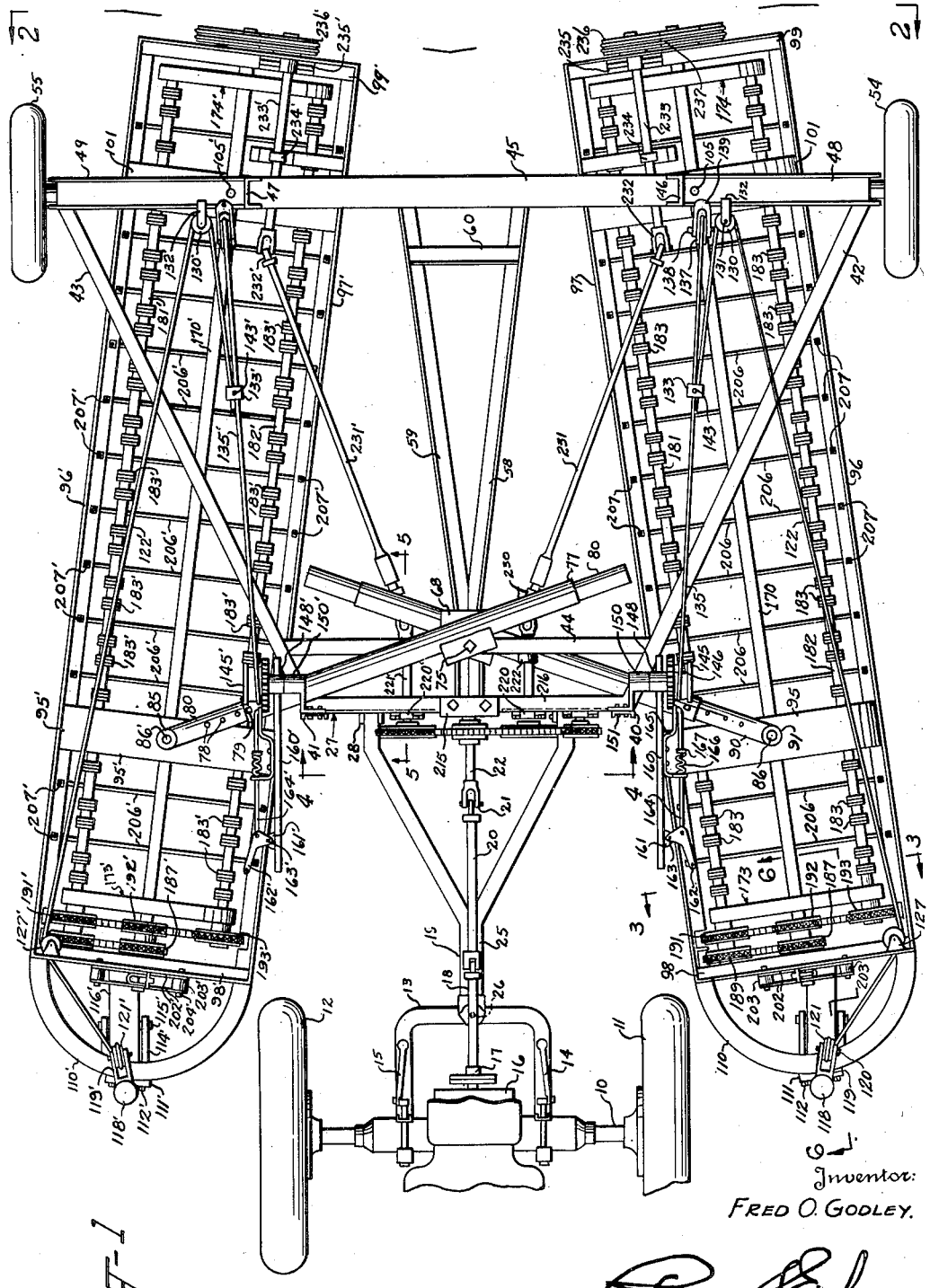

Referring more specifically to the drawings, the numeral 10 indicates the rear axle of a tractor with rear wheels 11 and 12. The tractor has secured thereto a U-shaped draw bar 13 braced by suitable brace bars 14 and 15. A differential housing 16 has projecting from the rear thereof a power takeoff 17 to which a shaft 18 is connected, and on the other end of the shaft 18 is a universal joint 19 to which the front end of another shaft 20 is attached, the rear end of shaft 20 having a similar universal joint 21 on the rear end thereof, and extending from the universal joint 21 is a shaft 22 which is employed in driving the reels of the rake and which will be later described.

The tractor draw bar 13 has a yoke 25 pivotally attached thereto as at 26, which in turn, is pivotally attached to the front end of a frame generally referred to by reference character 27, by means of brackets 28. The brackets 28 are welded to the frame 27.

That part of the frame 27 to which the right-hand bracket 28 is welded is an angular member 30 which projects downwardly and inwardly toward the center of the machine from the right-hand side in Figures 1 and 4 and a like member 31 also projects downwardly and inwardly from the left-hand side of the yoke 25 as shown in Figure 4.

Supported by the angle bars 30 and 31 and welded thereto are spaced metallic plates 32 and 33 in which a vertical shaft 34 is rotatably mounted. Welded to the lower end of the shaft 34 is a U-shaped member 35 having an axle 36 therethrough on which is rotatably supported a ground wheel 37. The top ends of the angle bars 30 and 31 are welded to vertical channel bars 40 and 41 respectively. Immediately above the top ends of the angle bars 30 and 31, and also welded to the channel bars 40 and 41 are horizontal angle bars 42 and 43 which extend rearwardly and outwardly and have a transverse angle bar 44 welded therebetween, and at their rear ends are welded to a horizontally disposed channel bar 45.

Approximately half-way between the center of the machine and the outside ends of the channel bar 45 are vertically disposed channel members 46 and 47, the lower ends of which are welded at their lower ends to the horizontally disposed channel bar 45 and have horizontally disposed and outwardly projecting channel bars 48 and 49 welded to the upper respective ends thereof. Welded to the extreme outside ends of the channel bars 48 and 49 and projecting downwardly therefrom are respective vertical channel bars 50 and 51.

The ends of the horizontally disposed channel bar 45 are welded to the vertically disposed channel members 50 and 51 and at the lower ends of the channel bars 50 and 51 there are horizontally disposed axles 52 and 53 fixedly mounted therein on which are rotatably mounted ground wheels 54 and 55.

The horizontally disposed angle bar 44 located near the front end of the frame 27 has two horizontally disposed angle bars 58 and 59 welded thereto at its central portion. The horizontally disposed angle bars 58 and 59 project rearwardly and slightly outwardly with respect to each other and are welded at their rear ends to the horizontally disposed transverse angle bar 45. A transverse angular bar 60 is welded between the angle bars 58 and 59.

The horizontally disposed angle bars 58 and 59 serve as braces and near the forward end thereof have, projecting downwardly and forwardly therefrom and welded thereto, angle bars 65 and 66, which have their lower ends welded to the plates 32 and 33. At the extreme forward end of the angle bars 58 and 59 and at their juncture with transverse angle bar 44, there is welded thereto and on top of same, a plate 68 and on the opposite or lower side of the angle bars 58, 59 and 44 there is welded a plate 69.

The plates 68 and 69 have a vertically disposed bolt 75 rotatably mounted therein and the upper end of this bolt extends through a horizontally disposed channel bar 76 which is welded to a horizontally disposed tubular bar 77 which is circular in cross-section and the tubular member 77, being horizontally disposed, extends somewhat to the right of the center of the machine and near the extreme left end thereof has slidably mounted therein a bolt 79. A tubular member 80 is extended back into the tubular member 77 and has longitudinal movement therein to allow inward and outward adjustment by means of the bolt 79 threadably engaging any one of a plurality of threaded holes 78.

The outward end of the tubular member 80 has welded thereto a vertically disposed bearing 85 in which a vertically disposed shaft 86' is slidably mounted for vertical movement. Shaft 86' is fastened to the reel frame, which will be later described.

Figure 2:
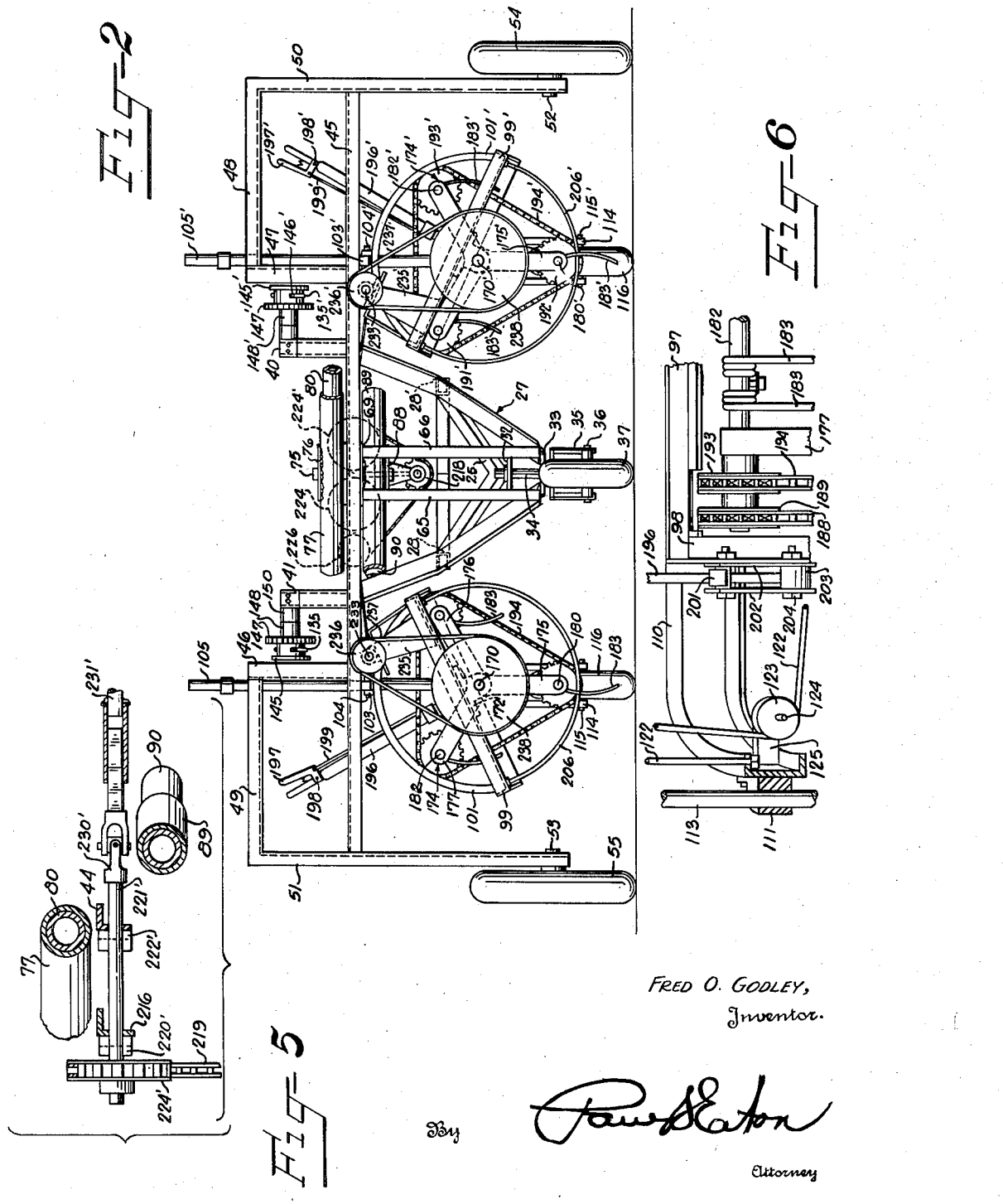
Figure 2 is an elevation looking at the rear end of the apparatus or from along the line 2—2 in Figure 1.

By referring to Figure 2, it is seen that the lower portion of the bolt 75 has rotatably mounted thereon a horizontally disposed channel bar 88 which is welded to a horizontally disposed tubular member 89 and the tubular member 89 has a tubular member 90 slidably mounted therein which has disposed at its outer end a vertically disposed tubular bearing which has another vertically disposed shaft 86 slidably mounted therein. The means for adjusting parts 89 and 90 relative to each other is identical to that for parts 77 and 80.

Since the two reels and reel frames of this machine are identical excepting for being opposite hand, a description of one half of the machine will be given and like reference characters will apply to the other side of the machine, with prime notations added.

The lower end of the vertically disposed shaft 86 is welded to an arcuate channel bar 95 and at the end of this channel bar 95 remote from the center of the mechanism, it is welded to a horizontally disposed angle bar 96 and the other end of the channel bar 95 is welded to another horizontally disposed angle bar 97. The forward ends of the angle bars 96 and 97 are welded to and joined together by an angle bar 98. The angle bars 96 and 97 are joined together at their rear ends by a transverse angle bar 99.

The angle bars 96 through 99 constitute a rectangular frame which supports the rake reel which will be later described. Toward the rear end of the angle bars 96 and 97 and immediately below the channel bar 45 is another arcuate channel bar 101, the ends of which are welded to the horizontally disposed angle bars 96 and 97. The arcuate channel bar 101 has a block 103 welded thereto and pivotally mounted in the block 103 by a hinge pin 104 is a vertically disposed shaft 105, which extends upwardly through the channel bar 45 and through the horizontally disposed channel bar 48 and it has free vertical movement in bars 45 and 48. The upper end of the vertically disposed shaft 105 has a collar 106 fixed thereon to prevent the rake reel frame from falling out of the machine accidentally.

Angle bar 98 at the front end of the rake reel has welded thereto a horizontally disposed bowed member 110 which has mounted at its extreme forward portion a bearing 111 which is held in place by any suitable means, such as screws 112. The bearing 111 has a shaft 113 (Figure 3) vertically disposed and slidably mounted therein. The lower end of the shaft 113 has an inverted U-shaped member 114 welded thereon which extends downwardly and rearwardly, and at its lower end has an axle 115 fixedly mounted therein, which rotatably supports a ground wheel 116.

At the upper end of the shaft 113 there is an inverted cup-shaped bearing 118 which is rotatably mounted on the shaft 113. Integral with the bearing 118 is a horizontally disposed U-shaped bracket 119 which has mounted therein as at 120 a pulley 121. A cable 122 has one end fixedly secured to the channel bar 110 and this cable projects upwardly and around the pulley 121 and then downwardly and around a pulley 123 (Figure 6). The pulley 123 is rotatably mounted on a shaft 124 which is fixedly mounted in a bracket 125 which is welded to the horizontally disposed bowed channel bar 110. The cable 122 passes under this pulley 123 and through a hole in the angle bar 98 and engages a pulley 127.

The pulley 127 is mounted in a bracket 128 and this bracket is welded to the angle bar 98. The cable 122 extends from the pulley 127 rearwardly and inwardly to another pulley 130 (Figure 1) and this pulley 130 is rotatably mounted on a shaft 131 which is fixedly mounted in a horizontally disposed bracket 132. The bracket 132 is welded to the horizontally disposed channel member 48 on one side of the machine and to the channel bar 49 on the other side of the machine. The cable 122 extends around the pulley 130 and then is extended forwardly and slightly inwardly on a horizontal plane and is attached to a coupling 133, (Figure 1).

The arcuate channel bar 101, which is welded to the angle bars 96 and 97, is near the rear end of the same, has a cable 135 fixed thereto and this cable extends upwardly and passes over a pulley 137, which is rotatably mounted on a shaft 138 and the shaft 138 is fixedly mounted in a bracket 139 mounted on bar 48 on one side of the machine and bar 49 on the other side of the machine.

After the cable 135 passes over the pulley 137 it extends forwardly and slightly inwardly on a horizontal plane and passes through the coupling 133. The coupling 133 being split horizontally is held together by a screw 143 and by tightening the screw 143, the cables 122 and 135 are closed together.

The cable 135 extends forwardly beyond the coupling 133 and passes over a flanged drumlike member 145 and the end of the cable is fastened to the drumlike member 145 by a screw 146. There is integral with the drum 145 a gear 147. The horizontally disposed drum 145 and the gear 147 are integral and are rotatably mounted on a shaft 149 and a hub 148 is also rotatably mounted on the shaft 149 and has integral therewith a lever 160 to be later described. The shaft 149 is fixedly mounted in a bracket 150 which is fastened to the vertically disposed channel bar 40 or 41 by bolts 151.

Integral with the bracket 150 is a lug 152 (Figure 7) which extends downwardly and rearwardly and is near the outward portion of the bracket 150 and the lug 152 has a pin 153 fixedly mounted therein. Rotatably mounted on the pin 153 is a lever 154 and the lever 154 has a pin 155 fixedly mounted therein which is allowed to engage the gear 147 to prevent the gear from turning. Fixed to the hand lever 154 is a spring 156 which at its other end is fastened to the bracket 150. This will cause the pin 155 to remain in engagement with the gear 147 until it is moved manually in a rearward direction.

Near the forward end of the lever 160 (Figure 1) and projecting outwardly from the side thereof is a lug 161 which has a handle 162 pivoted thereto by a pin 163. The handle 162 has one end of a shaft 164 pivotally mounted therein and the shaft 164 is bent and extends rearwardly through a bracket 165. The bracket 165 is riveted to the lever 160 and after the shaft 164 extends through this bracket 165 it has a coil spring 166 encircling it and the coil spring 166 is confined by a collar 167 which is fixed to the shaft 164. The rear end of the shaft 164 is bent inwardly and is guided by another portion of the bracket 165 and extends through the bracket 165 and passes into engagement with the gear 147. The coil spring 166 holds the rear end of the shaft 164 in engagement with the gear 147.

It is evident that by pressing the handle 162 inwardly the shaft 164 may be withdrawn from the gear 147 thereby allowing the lever 160 to be raised or lowered and it may be raised to another position and the shaft 164 may then be released and allowed to engage another portion of the gear and then by manually moving the lever 154 rearwardly, the gear may be rotated in either direction, that is clockwise or counter-clockwise, depending upon whether it is desired to raise or lower the rake frame.

When the gear has been rotated to the position desired, the lever 154 is then released and the pin 155 is permitted to engage the gear 147, thereby preventing its moving because it is generally under the heavy tension of the cable 133.

When the cable 133 is moved in a forward direction around the drum 145 it raises the rear portion of the rake reel frame, which is comprised of angular members 96 through 99, and the cable 122 being fixed to the cable 135 as at 133 will raise the forward end of the frame, comprised of members 96 through 99 including the horizontally disposed channel bar 110.

Referring again to the rake reel, a shaft 170 is fixedly mounted at its forward end in a sprocket wheel 187 whose hub portion is rotatably mounted in a bearing 171 which is fixedly secured to the angle bar 98 (Figure 3). The hub portion of sprocket wheel 187 projects forwardly of the bearing 171 and has a lever 196 integral therewith. The rear end of the shaft 170 is rotatably mounted in a bearing 172 secured to the angle bar 99 (Figure 2).

Adjacent the proximate sides of the bearings 171 and 172 and fixed near each end of the shaft 170 are two spiders 173 and 174, each having three arms 175, 176 and 177 which are spaced 120 degrees apart. The spider near the forward end of the machine is designated broadly by reference character 173 and the spider near the rear end of the machine is designated broadly by the reference character 174.

Rotatably mounted in the spiders 173 and 174 are shafts 180, 181 and 182. The tines 183 are of spring wire and are conventional.

The sprocket wheel 187 engages a sprocket chain 188 and the sprocket chain 188 also engages a sprocket wheel 189 fixedly mounted on the shaft 181 (Figure 3). Integral with the sprocket wheel 189 is another sprocket wheel 191 and the shafts 180 and 182 also have single sprocket wheels 192 and 193 fixedly mounted thereon.

A sprocket chain 194 is mounted on all three of the sprocket wheels 191, 192 and 193. All of the sprocket wheels 187, 191, 192 and 193 are of the same size thereby permitting uniform motion to all of the tines.

The lever 196 projects upwardly and has a bell crank handle 197 at its upper end having one of its ends pivotally mounted as at 198. A rod 199 is pivotally mounted in the handle 197 and is bent downwardly and has pivotally attached to its lower end a pawl 201 which is slidably mounted on the lever 196. As the lever 196 projects upwardly it passes between two arcuate members 202 which are held apart by two sleeves 203 and passing through the members 202 and 203 and the angle 99, are bolts 204. The arcuate members 202 have a plurality of grooves 205 adapted to receive the pawl 201. By pressing the handle 197, the lever 196 may be moved to the right or to the left in Figure 3 as may be required and in so doing, the angle at which the tines 183 contact the material being raked may be adjusted.

The horizontally disposed angle bars 96 and 97 have secured thereto the ends of a plurality of arcuate rods 206, these rods serving as guards. These guards 206 project downwardly from the angle bar 96 and curve inwardly toward the center of the rake reel and then curve again upwardly and penetrate the horizontally disposed angle bar 97. The ends of the guards 206 are secured to the angle bars 96 and 97 by nuts 207. One of these rods is disposed between adjacent sets of tines mounted on the shafts 180, 181 and 182. The function of the curved guards is to shed the material from the tines.

Instead of having means as described in said above identified patent application for driving the reels or rakes, I have provided an improved means for driving the same. The drives being identical for the two reels, a description of one will be given and like reference characters will apply to the other side with the prime notation added.

This improved means comprises a bearing block 215 mounted on an angle bar 216 having its ends secured to the proximate or forward ends of angle bars 42 and 43. The bearing block 215 projects downwardly and has the rear end of the shaft 22 rotatably mounted therein. The shaft 22 has fixed thereon a sprocket wheel 218 on which is mounted a sprocket chain 219. Mounted on the bar 216 are bearing blocks 220 and 220' in which are rotatably mounted shafts 221 and 221' which are also rotatably mounted in bearings 222 and 222' disposed on the angle bar 44.

The front ends of shafts 221 and 221' have fixed thereon sprocket wheels 224 and 224' and an idler stub shaft 225 is also mounted on the front surface of angle bar 216 and has rotatably mounted thereon an idler sprocket 226. The sprocket chain 219 passes over the idler sprocket 226 and beneath and in contact with the sprocket wheel 224 and then over the top of sprocket wheel 224' and back and below the sprocket 218 and by this arrangement the two shafts 221 and 221' are rotated in opposite directions.

The shaft 221 has secured on the rear end thereof a universal joint 230 to which is connected the forward end of an angularly disposed shaft 231 which extends rearwardly and has its rear end secured to a universal joint 232 disposed on the forward end of a shaft 233 which is rotatably mounted in bearing blocks 234 and 235 and on the rear end of shaft 233 is mounted a V-pulley 236 on which is mounted a V-belt 237 which is also mounted on a larger V-pulley 238 secured on the rear of the shaft 170.

It is thus seen that a simplified drive has thus been provided for the two rotating reels or rakes and does not involve the off set pulleys as shown in said co-pending application.

In the drawings and specification there has been set forth a preferred embodiment of the invention, and although specific terms are employed, they are used in a generic and descriptive sense only, and not for purposes of limitation, the scope of the invention being defined in the claims.

I claim:

1. A hay rake comprising a main frame having supporting wheels at each side of the rear end of the main frame and having a supporting wheel near the front end of the main frame, a draw bar pivotally secured to the front end of the main frame and having means for attaching the same to a prime mover, a driven shaft in the main frame, a pair of reel frames suspended on vertical pivot points from the main frame at their rear ends and having a ground wheel at their front ends, unitary means mounted on the main frame and having connection with the rear end of each reel frame and with the ground wheel at the front end of each frame and with the front end of the reel frame itself for vertically adjusting the position of the reel frames relative to the ground, a pair of adjustable means pivotally mounted on the front end of the main frame and extending outwardly in divergent directions and having their outer ends pivotally connected to the front portions of the reel frames for adjusting the position of the front end of the reel frames inwardly and outwardly relative to the longitudinal axis of the main frame, a rotary reel mounted in each of the reel frames, means driven by the driven shaft for imparting rotation to the reels, the means for imparting rotation to the reels comprising a pair of parallel shafts driven by the driven shaft, a second pair of parallel shafts on the rear ends of the reel frames, a driving connection between the first and second pairs of parallel shafts, and a driving connection between the second pair of parallel shafts and the reels.

2. In a center delivery hay rake, a main frame having rear wheels at each side thereof and a front wheel near the front wheel thereof, a draw bar pivotally secured to the front end of the main frame, a main drive shaft extending longitudinally of the main frame, a pair of reel frames having their rear ends pivotally mounted on each side of the main frame, means for adjusting the front ends of the reel frames inwardly and outwardly with respect to the front ends of the main frame, each of the reel frames comprising a rotary reel, a pair of longitudinally extending shafts on the front portion of the main frame, a second pair of longitudinally extending shafts on the rear end of the reel frames, an intermediate drive shaft connected at its ends by universal joints to the longitudinally extending shafts on the main frame and the longitudinally extending shafts on the reel frame, a driving connection between the reels and the longitudinally extending shaft on the rear end of each reel frame.

3. In a center delivery hay rake, a main frame having wheels for supporting the same, a pair of reel frames suspended on vertical pivots at their rear ends from the main frame, the reel frames at their front ends having a ground wheel and the front end of each reel frame being vertically slidable relative to its ground wheel, means mounted on the main frame and connected to the front and rear ends of each reel frame for raising and lowering the reel frame relative to the main frame and the ground wheel supporting the front end of each reel frame, a main drive shaft mounted in the main frame, a pair of shafts on the main frame driven by the main drive shaft, each reel frame having a reel mounted for rotation therein, a rotary shaft on each reel frame having a driving connection with the reel, a driving connection between each of the shafts on the main frame and a rotary shaft for imparting rotation to the reels and telescopic members pivotally mounted on the main frame and extending outwardly in diverging relation and having their outer ends pivotally connected to the reel frames for adjusting the front end frames towards and away from each other.

4. In a center delivery hay rake, a main wheeled frame having an arcuate portion near the rear of the frame and having a draw bar secured to its front end, a main drive shaft mounted in the wheeled frame, a pair of rake frames suspended from the main frame, means for simultaneously raising the front and rear ends of the rake frames relative to the main frame, each rake frame having a rotary reel mounted therein and extending longitudinally thereof, telescopic means secured between the front end of the rake frames and the main wheeled frame for adjusting the front ends of the rake frames outwardly and inwardly with respect to each other to determine the width of swath covered by the rake, means driven by the main drive shaft and connected to the reels for imparting rotation to the reels, said last-named means comprising a pair of parallel shafts driven by the main drive shaft, a shaft mounted on the rear end of each rake frame and having a driving connection with one of the parallel shafts, and a driving connection between each of shafts on the rear end of each rake frame and the reel in its associated rake frame.

5. A hay rake comprising a wheeled frame, a pair of reel frames mounted in the wheeled frame and connections between the wheeled frame and the reel frames for adjusting the front ends of the reel frames toward and away from each other, each of the reel frames being pivoted near their rear ends on a vertical pivot to the wheeled frame, a rotary reel having tines thereon disposed in each of the reel frames, said wheeled frame having a draw bar, each of the reel frames having a longitudinally disposed reel shaft, the wheeled frame having a longitudinally disposed drive shaft and a pair of parallel shafts disposed adjacent the longitudinally disposed drive shaft, the longitudinally disposed drive shaft and the two parallel shafts having sprocket wheels thereon and a sprocket chain mounted on all of the sprocket wheels and whereby rotation of the longitudinally disposed shaft by the power takeoff shaft will impart rotation to the two parallel shafts, a connection between the parallel shafts and the shafts disposed on the rear portion of the reel frames for imparting rotation thereto, and a driving connection between each reel shaft and the shaft disposed on the rear portion of the reel frames.

6. A center delivery hay rake comprising a main wheeled frame and a draw bar secured thereto, a pair of reel frames disposed below the main frame and a pivoted connection between the rear ends of the reel frames and the main frame, means for raising and lowering the reel frames with relation to the main frame, means connecting the front portions of the reel frames with the main frame for adjusting the front ends of the reel frames inwardly and outwardly with respect to each other, each of the reel frames having a ground engaging wheel on the front end thereof, each reel frame having a rotatable shaft mounted thereon and a plurality of spider members fixedly mounted on the rotary shaft in the reel frames and the spider members having in their free ends tine shafts with a plurality of tines thereon, a driven shaft disposed in the central portion of the main frame, a pair of shafts parallel to the driven shaft and disposed on each side of the driven shaft in the front end of the main frame, a rotatable shaft mounted longitudinally of the reel frames and disposed at the rear end of each of the reel frames, a driving connection between each of the reel shafts and the longitudinally disposed shaft disposed at the rear end of the reel frame, a universal driving connection between the parallel shafts and the longitudinally disposed shafts mounted at the rear ends of the reel frames, and a driving connection between the shaft in the front end of the main frame and the two parallel shafts disposed on each side thereof and means for reversing the direction of rotation of the two parallel shafts to thereby change the direction of rotation of the reel shafts.

FRED O. GODLEY.

REFERENCES CITED

The following references are of record in the file of this patent:

UNITED STATES PATENTS

| Number | Name | Date |
|---|---|---|
| 1,009,095 | Randall | Nov. 21, 1911 |
| 1,251,373 | Holeman | Dec. 25, 1917 |
| 1,283,674 | Clausen | Nov. 5, 1918 |
| 1,291,392 | Burgess | Jan. 14, 1919 |
| 1,877,770 | Larson | Sept. 20, 1932 |
| 1,895,432 | White | Jan. 24, 1933 |
| 2,296,065 | Slamp | Sept. 15, 1942 |
| 2,336,117 | Moschel et al. | Dec. 7, 1943 |
| 2,436,475 | Jones et al. | Feb. 24, 1948 |